Patented Sept. 13, 1938

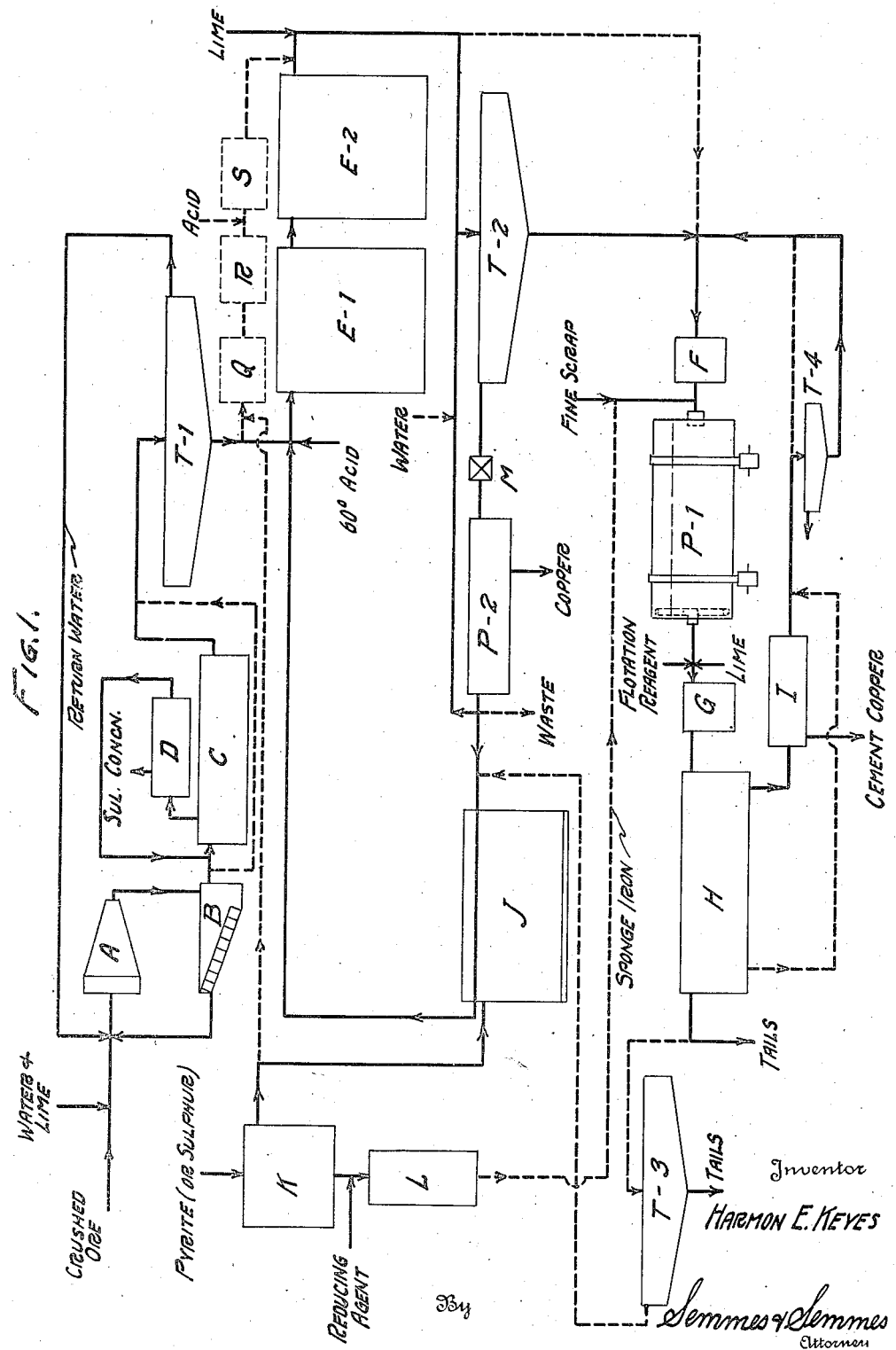

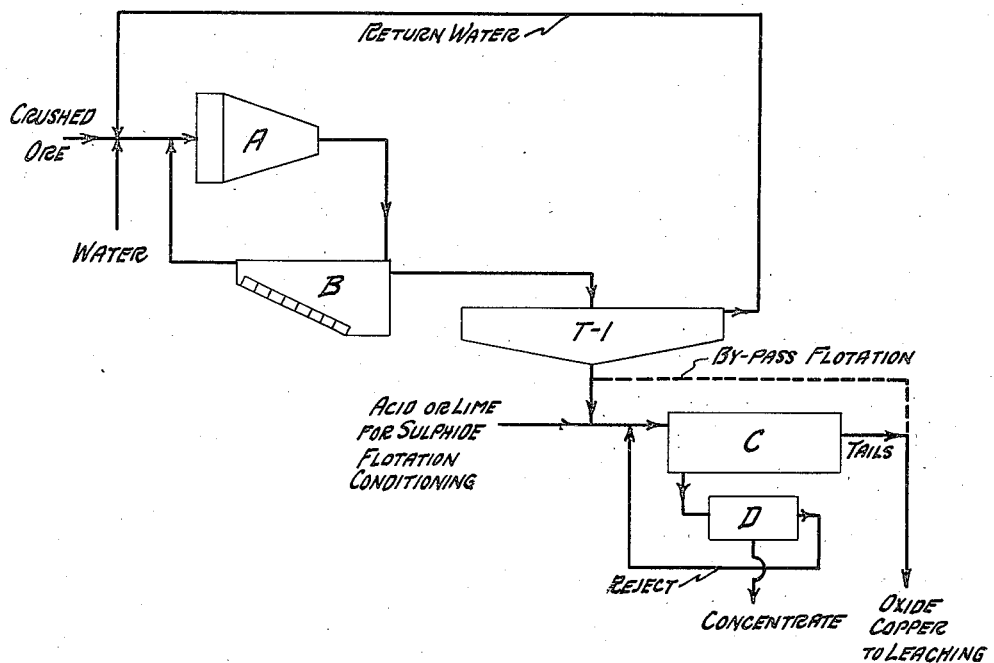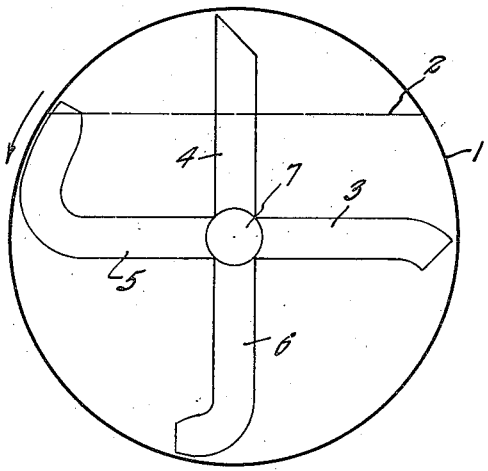

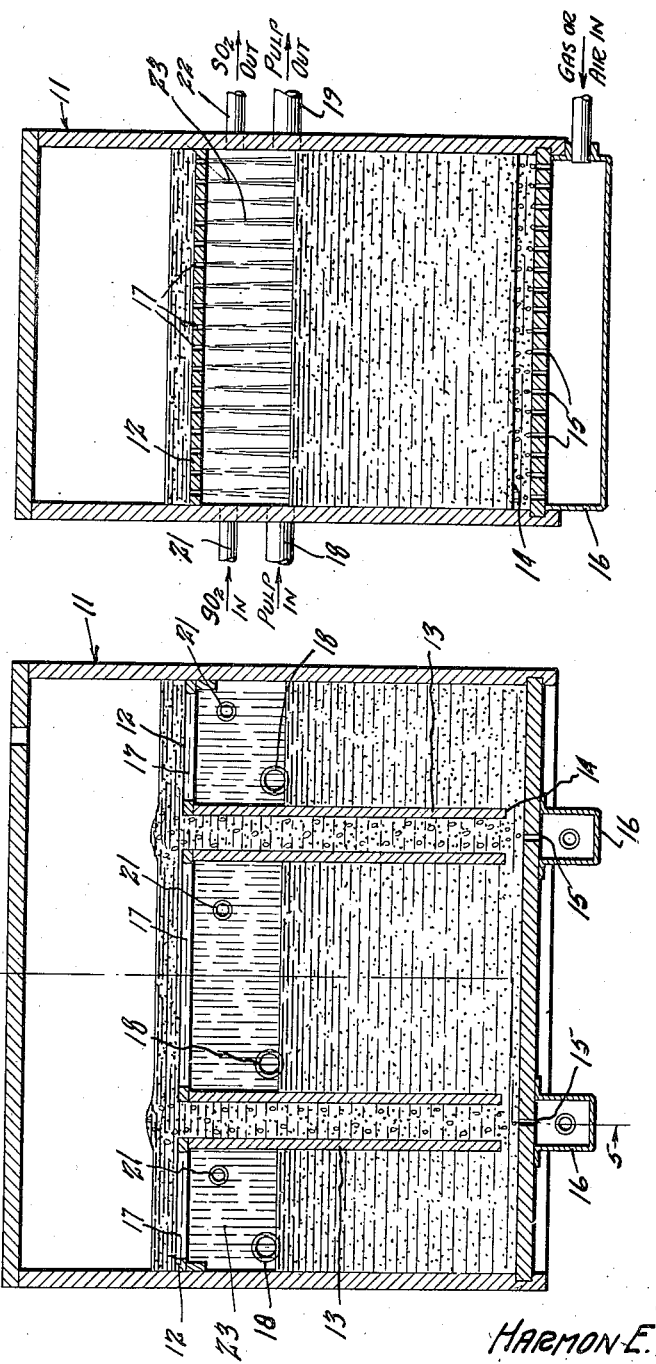

2,130,278

UNITED STATES PATENT OFFICE 2,130,278

LEACHING-PRECIPITATION-FLOTATION PROCESS

Harmon E. Keyes, Miami, Ariz.

Application September 1, 1934, Serial No. 742,497

34 Claims. (Cl. 75—2)

The advantages of treating an ore having copper values as non-sulphide forms, by leaching with sulphuric acid, agitating with some suitable form of metallic iron such as sponge iron, scrap or balls and recovering the resulting finely divided cement copper in the metallic condition by flotation have long been realized. However, due to difficulties encountered in the cofunctioning of the various steps of the process this method has not, prior to the following described invention, found successful commercial application. By my method as here given, the various units of the process function together as a whole as well as individually in such manner as to consistently produce copper in an economical manner and without metallurgical or mechanical obstacles. The present method involves the use of recent improvements which I have developed, such as given in my Patents No. 1,971,416 and 2,070,133, and constitutes a complete process for production of copper by the so-called leach-precipitation-flotation method, as well as certain decided improvements in some of the individual steps.

Former methods of conducting this type of process have overlooked the functions and the effects of such important factors as (1) control of pulp density; (2) certain electro-chemical reactions taking place during copper cementation, especially when metallic copper and metallic iron are in physical contact; (3) the presence of dissolved copper in the effluent from the precipitation apparatus employing metallic iron; (4) the fundamentals and control of resolution of cement copper subsequent to the initial precipitation; (5) the tendency of cement copper to oxidize and become unfloatable during aeration or flotation treatment; (6) the effect of hydrogen ion concentration of the pulp solution on cement copper flotation, particularly as to conditioning of the pulp prior to flotation; (7) the regulation, control and use of iron, both dissolved and precipitated, in the cement copper flotation circuit and in any solvent regenerative stages that may be employed, and (8) the retreatment, handling and disposition of middlings and/or forms of copper rendered non-floatable by the plant treatment in the cement copper circuit.

On the contrary, my process as here described takes all the above factors into account, introduces novel components and combines certain treatment steps in such a way as to produce a new result which is the successful operation of the leach-precipitation-flotation process as a whole.

I have found that by following the type of steps and the combination thereof as I propose in the following description, former obstacles are overcome and the various stages function so that the entire process is coordinated, giving high grade concentrates and low tailings as end products at low cost and without metallurgical difficulties. Among the salient steps of my improved process are the following—

(1) Pulp thickening after grinding and before leaching.

(2) Precipitation by metallic iron using either a slight excess of sponge iron over the stoichiometric equivalent of the copper in solution, or employing a bed of iron of such size of particles that the iron is retained in large excess in the precipitator while a portion of the copper is precipitated in nodular form and the remainder is precipitated and removed in finely divided form as the pulp passes through. Also the inhibition of excessive copper nodule growths in the precipitator charge, by removal of pulp from the bottom of the charge.

(3) Partial precipitation of iron, further precipitation of copper and conditioning of pulp for cement copper flotation by adding an alkaline precipitant in limited amounts after precipitation of copper by iron and before flotation of cement copper, thereby recovering cement copper by flotation in presence of both dissolved and precipitated forms of iron.

(4) Removal of cement copper flotation middlings, secondary concentrates and intermediate products from the main circuit, giving said products a special treatment to re-convert the altered material back to a floatable form and then subjecting such reconditioned cement copper products to a further flotation treatment.

(5) Removal of ferrous sulphate solution either from the cement copper tailings pulp or from decanted clear solution obtained by precipitating copper by iron, contacting said solution with sulphur dioxide and air to produce sulphuric acid and/or ferric sulphate or both, and addition of said acidic solution, followed by supplemental sulphuric acid, to the leaching circuit to effect dissolution of copper in the ore.

It is understood that the above steps may be subject to considerable variation without deviating from the process here claimed and that the above steps are susceptible of many combinations to suit specific conditions.

The individual steps of my process are shown in the accompanying drawings, in which, Figure 1 shows the complete process, and Figure 2 shows an alternative step for the flotation of sulphides.

Figure 3 is a diagrammatic view of a preferred type of precipitator.

Figure 4 is a diagrammatic longitudinal sectional view of a device for use in the absorption and aeration steps of my process.

Figure 5 is a cross-sectional view of the apparatus of Figure 4, taken along the line 5—5 of Figure 4.

The crushed ore and water are introduced to the ball mill A, where the ore is suitably comminuted and formed into a pulp. The discharge from the ball mill is passed to a classifier B, which is in closed circuit with the ball mill A, the classifier overflow being sent to the subsequent treating stages.

If sulphides are present in the ore in amounts sufficient to warrant their separate recovery, such sulphides may be extracted by a sulphide flotation step prior to the leaching-precipitation-flotation proper. Such sulphide flotation may be conducted either in an acid or alkaline circuit, depending upon the type of ore undergoing treatment.

In either event, and regardless of whether the sulphides are preliminarily floated or not, the pulp prior to leaching is suitably thickened.

I have found that concentration of solution with respect to acid, copper and iron salts as well as the percent solids in the pulp are important factors affecting pulp conditioning as shown by froth characteristics, and the resulting amenability to flotation when dealing with cement copper. Furthermore, in order to effect the most economical leaching, precipitation and cement copper flotation treatments, the pulp density must be controlled within certain limits.

A pulp density of less than 30 percent solids is generally required to permit of the most economical grinding and classification. I have found that leaching, precipitation, conditioning for cement copper flotation as well as the cement copper flotation operation itself is best conducted at a higher pulp density than that employed in grinding and classification, and that the proper pulp density, by reason of its governing the concentration of the various substances in solution when dealing with a given grade of ore, is vital to successful conditioning and froth formation for cement copper flotation. I therefore employ the method of varying the pulp density during the treatment process so that those vital steps in the process which are affected by pulp density may be conducted under the conditions which permit of their most successful functioning.

Inasmuch as I have found that all the steps including and subsequent to leaching, are best conducted at a pulp density much greater than that suitable for grinding and classification, I propose to include as an improvement on former methods, the step of thickening the pulp prior to leaching. This is readily accomplished by use of a standard type thickener which reclaims water, that may be alkaline, for subsequent milling operations and supplies a pulp of the desired density to the leaching, precipitation and flotation operations. By such a plan the so-called "milling" steps which include grinding, classification and possibly preliminary sulphide flotation, and the so-called "hydro-metallurgical" steps which include leaching, copper precipitation, pulp conditioning for cement copper flotation, flotation of cement copper and treatment of cement copper middling or intermediate products, are entirely independent of each other as regards the vital step of pulp density.

It has been shown by actual tests that the final tailings are essentially the same regardless of whether the sulphide copper is floated prior to or simultaneously with the cement copper. Similarly, tests also showed that by increasing the pulp density after grinding and before leaching, an increased efficiency was obtained in leaching, precipitation and flotation.

The pulp may be thickened either prior to or subsequent to the sulphide flotation. If the sulphides are floated in an alkaline circuit, lime or some other suitable agent may be introduced along with the water prior to grinding, and the thickening may be subsequent to the flotation stage. Figure 1 shows an arrangement for sulphide flotation in an alkaline circuit, and it will be noted that lime is added with the water prior to grinding. In this arrangement the classifier overflow is sent to the rougher C, and then to the cleaner D from which the sulphide concentrates are removed and cleaner rejects recirculated to the rougher. The tailings from the rougher are thickened in thickener T—1, and the overflow therefrom returned to the charge entering the ball mill A while the thickened product is sent to the leaching operation.

I may, however, thicken the pulp prior to flotation and condition the thickened pulp for sulphide flotation with an acid or suitable alkali agent as desired. I rather prefer this arrangement inasmuch as acid circuits are sometimes used, and such a circuit would dissolve oxide copper in certain types of ore. If an acid circuit were used, it would necessitate an acid-proof thickener if the thickening succeeded flotation, and the copper in the overflow would be too dilute to readily recover.

In Figure 2 I have shown an arrangement for thickening prior to sulphide flotation. In this arrangement it will be noted that water alone is added to the charge to the ball mill and that the classifier overflows are thickened in thickener T—1 prior to sulphide flotation. The overflow from thickener T—1 is returned to the ball mill charge. Acid is added to the thickened pulp from T—1, or, if the sulphides are to be floated in an alkaline circuit, lime may be added to such pulp. In this case C represents the rougher and D the cleaner, which operate in the same manner as discussed above in connection with Fig. 1. The sulphide tailings are sent to the leaching stage.

As indicated in both Fig. 1 and Fig. 2, the sulphide flotation stage may be by-passed when desired.

As heretofore pointed out, the thickened pulp from thickener T—1 or the tails from rougher C are passed to the leaching stage. Leaching may be accomplished by use of commercial sulphuric acid, by dilute acid produced from sulphur dioxide and iron solution, by sulphur dioxide and air applied directly to the ore, or by sulphur dioxide and air or dilute acid followed by strong sulphuric acid.

Sulphur dioxide, because of its affinity for the basic constituents of the ore, may generally be used directly in lieu of sulphuric acid to any desired extent in leaching copper oxide ores. Its use involves the steps of gas absorption by the pulp (thus forming sulphites and bi-sulphites), aeration to change these compounds to stable sulphates, and then completion of the leach, if necessary, by adding a small quantity of sulphuric acid.

The absorption step is best conducted, not with hot gas as in certain former methods, but in the cold. This may be conveniently done by elevating the pulp by air lift action, allowing it to fall back into the main body as a stream or cascade and passing the sulphur dioxide gas transversely through the cascading stream of pulp, as in the method used for acid regeneration with sulphur dioxide and iron sulphate, as described in my Patent No. 1,952,675.

The aeration stage may require one to two hours for complete conversion to sulphate, whereas the gas absorption may only require a few minutes. These two stages should be conducted in separate units and may be accomplished in tanks or modified cells provided with both air lift and cascade action. Apparatus such as shown in my Patent No. 1,952,675, when modified so as to handle ore, would be well suited for the gas absorption and the aeration units. In this conversion step the bi-sulphites evolve sulphur dioxide which is available for continued leaching. Simultaneously, the normal sulphites are oxidized to sulphates.

The final addition of sulphuric acid not only provides for completion of the leach but also decomposes any remaining sulphites or bisulphites, thus producing a pulp which is amenable to subsequent flotation.

When the available sulphur dioxide is relatively cheaper than sulphuric acid its use as an adjunct in providing for the gangue consumption of acid may be advantageous. As compared to use of dilute acid, produced by regeneration with sulphur dioxide, it offers the possible advantage of not causing pulp dilution.

Apparatus for the alternative steps is disclosed in Fig. 1. The full lines indicate apparatus for use in leaching by commercial sulphuric acid or by dilute acid. In this case, there is a series of agitators E—1 and E—2.

If it is desired to leach with sulphur dioxide applied directly to the ore or by sulphur dioxide followed by sulphuric acid, the thickened pulp is first sent to Q where sulphur dioxide from the roaster K is absorbed. A certain amount of air is of course included in the gas from the roaster. From Q the pulp is passed to an aerator R, in which the pulp is thoroughly aerated.

As heretofore pointed out, apparatus such as shown in my Patent No. 1,952,675 (Figures 4 and 5 of the drawings of this patent) may be used for the absorption and aeration stages, provided it is modified to handle ore pulp. The schematic apparatus shown in Figure 4 comprises a vessel, designated generally 11, which is provided with a platform 12 and wells 13 depending from the platform and traversing the vessel 11. It will be noted that the wells 13 terminate, as at 14, short of the base of the vessel 11 and are positioned above apertures 15 which communicate with headers 16. The headers 16 are supplied with air or some other suitable gas under pressure, which is free to pass through the apertures 15.

The platform 12 is provided with a series of longitudinal slots 17. Pulp is admitted to the vessel through pipes 18 and is discharged through pipe 19. Sulphur dioxide gas is introduced to the vessel through pipe 21 and exhausted therefrom through pipe 22. It will be appreciated that the gas under pressure from header 16 will raise the column of pulp within the wells 13 to form a body of pulp above the platform 12. This elevated pulp in turn will fall in sheets 23, and the stream of sulphur dioxide is directed against such sheets at substantially a right angle. The amount of pulp in the elevated body above the platform is such as to insure a substantial head, and consequently the sheets 23, and their entrained gases, are carried well beneath the surface of the main body of pulp.

If it is desired to supplement the direct sulphur dioxide leaching by the use of sulphuric acid, such acid may be added to the pulp from R followed by further agitation in S. The advisability of supplementing the sulphur dioxide leaching by the use of acid will, of course, depend upon the particular ore treated and the conditions of operation.

If an acid circuit is employed for the sulphide flotation, additional acid may be used and some leaching effected during the sulphide flotation. If sulphur dioxide is used directly for leaching, it would of course be necessary to add it after the sulphide flotation inasmuch as sulphur dioxide forms sulphites which are injurious to the sulphide flotation.

Following the leaching operation some residual sulphuric acid usually remains in the pulp. Former methods have either added this acidic pregnant solution to the metallic iron precipitant or else have used limestone for neutralization prior to precipitation. In the former case the iron consumption is excessive and often the precipitated cement copper is in an acidic pulp which promotes re-solution of cement copper. If limestone is resorted to for neutralization, certain obstacles are encountered as unless the limestone is ground extremely fine the reaction is slow and incomplete.

My method preferably employs use of a water soluble alkaline substance, such as milk of lime, in place of limestone. This forms an emulsion with water more readily than limestone, is more rapid in its action and is more readily transported through pipes around a plant and if added in slight excess will form copper hydroxide after the acid is neutralized. This slight precipitation of copper may have advantageous features under certain conditions as it insures complete neutrality and conserves metallic iron, and under certain neutral conditions is converted to metallic copper according to the reaction—

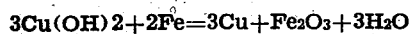

$$3Cu(OH)_2 + 2Fe = 3Cu + Fe_2O_3 + 3H_2O$$

Thus, fifty percent more copper may be precipitated per unit of iron consumed than under ordinary conditions. The above reaction is made possible by the use of a neutral solution which is insured by precipitation of a limited amount of copper hydroxide. It is understood, however, that even if the solution shows a slight acid reaction on entering the precipitator, there may still be present sufficient excess of milk of lime particles to eventually completely neutralize the free acid during precipitation with metallic iron. However, both the feed and discharge pulp from the precipitator may be distinctly acid without departing from the spirit and purpose of the general process here described.

As will be later pointed out, flotation middling products may be substituted for or may supplement the neutralizing action of the milk of lime or other water soluble alkaline substance. If dilute acid is used for the leaching, I prefer to send the leached pulp to a thickener T—2, inasmuch as such dilute acid causes a dilution of the pulp. If the pulp is not sufficiently dilute to warrant thickening, thickener T—2 may be by-passed as indicated by the dotted lines.

As an improvement over former precipitation methods in clear solution, my process may include the following steps:

The amount of clear copper solution decanted from the above mentioned thickener T—2 is governed by a regulating device of any suitable means, the balance of the solution in the thickener feed mixing with the underflow to the cement copper flotation. The clear overflow goes to a suitable precipitator for removal of copper and then any desired fraction of the iron-bearing solution returns to dilute this thickener feed, and by means of this increased volume of recirculating solution through the thickener makes possible recovery of any desired fraction of the total copper from said clear solution. If desired, a portion of such return solution may go to the acid regenerator circuit and a portion may be discarded. Furthermore, a certain amount of fresh make-up water may be added as dilution medium to supplement the return discard solution mixing with the thickener feed.

Referring to Figure 1, the overflow from thickener T—2 is regulated by gate M, and then passed through precipitator P—2, which may involve a rotary drum, scrap iron boxes or even electrolysis. By returning this precipitator effluent solution at least in part to dilute the feed to T—2, a closed circuit wash is effected through the solids in T—2 and in regulating the flow by M the fraction of the total dissolved copper which is precipitated and recovered in P—2 may be varied over wide ranges. If no solution from P—2 is discarded, the precipitation need be only partially complete in P—2. If desired, some fresh water may be added for dilution.

Also, part of the effluent from P—2 may be wasted and part or all may be passed through the acid regeneration cell J, where, by contact with sulphur dioxide and air, such as shown in my Patent No. 2,055,082, acid and/or ferric sulphate are produced for subsequent leaching. This sulphur dioxide may be obtained from any suitable source as from pyrite or sulphur, the pyrite being logically a by-product from preliminary sulphide flotation. This regenerated acid may be supplemented to any extent by 60° Bé. acid.

The calcine roasted in K is then preferably charged hot into the sponge iron furnace L and converted to sponge iron, by any suitable method, but preferably according to the method given in my Patent No. 2,036,578. However, scrap may be used to any extent in place of sponge iron, or the sponge iron may supplement the scrap.

I prefer, when possible, to employ so-called "regenerated acid" for leaching, either as the entire solvent or as an adjunct to sulphuric acid and/or ferric sulphate produced from other sources. Such acid uses as a base discard iron solutions, obtained from clear solution or by decanting from pulp after copper recovery, and contains generally from 3 to 10 percent free sulphuric acid and a smaller amount of ferric sulphate. The use of such solution causes considerable pulp dilution in the leaching circuit.

Therefore, when employing such dilute acid or ferric sulphate which is justified under ordinary conditions by cheaper cost or metallurgical benefits of the ferric sulphate, I recommend the use of an acid-proof thickener following the leaching step. This makes possible decantation of clear, copper-bearing solution and thickening of the pulp to the desired density for conducting precipitation and cement copper flotation under the most favorable conditions. Experimental data showed that leaching a pulp, originally thickened to 60 percent solids, with 6 percent acid, resulted in a pulp containing 46 percent solids. Similarly, 3 percent acid solution added as leaching solvent reduced the percent solids from 60 to 36 percent.

Recovery of copper from the decanted solution may be accomplished by any standard method, as with iron, or by the novel modification hereinafter disclosed.

Further tests also showed that with pulp initially at 34.7 percent solids and 12.88 lbs. per ton copper in solution, 50 percent of the total dissolved copper could be recovered in a standard 100 foot diameter thickener at 3,000 tons per 24 hours, the underflow being 50 percent solids. Similarly, by diluting the feed to 13.55 percent solids the copper was correspondingly diluted to 3.94 lbs. per ton, but the copper reclaimed in the clear solution overflow increased to 83 percent of the total dissolved copper.

From the above, it may be seen that by using dilute acid for leaching, the solids may be brought to the desired degree for cement copper precipitation and flotation by thickening after leaching. The decanted solution may be entirely returned to dilute the thickener feed, in which case the solids are the same in the feed prior to dilution and in the underflow, or any desired part of this solution may be removed from the thickener system and used for solvent regeneration or discarded.

In case T—2 is by-passed, the leached pulp is sent through a mixing device F to complete the reaction with lime. The metallic iron is then added and the pulp fed to the rotary precipitator P—1. As shown by Figure 3 of the drawings, this is equipped with a special discharge device which selects material around the periphery during rotation and discharges at the axis, thus advancing the solid copper as precipitated and preventing accumulations. In order to maintain the pulp within the drum and control the discharge, suitable gland connections of any desired type are of course provided at either end when required. An agitator tank could be substituted for the drum in case of sponge iron.

The precipitating step using metallic iron may be either of two types, viz:

(1) The iron is very finely divided, travels concurrently with the pulp through the precipitator and hence does not accumulate or form a bed as the pulp travels through the precipitator. Usually a small excess of metallic iron continues with the pulp.

(2) The iron is relatively coarse, such as cut scrap, flakes or granules, and remains in considerable excess as a charge in the precipitator through which the pulp is passed. No large excess of iron in the pulp, however, is present after the pulp leaves the precipitator. In the latter case, if reclaimed scrap, such as tin cans, is used, foreign matter, such as copper or brass articles may be present.

I have found that when a copper and iron surface continue in contact together and are immersed in a copper-iron sulphate solution, electrolytic action takes place and deposits copper on the copper surfaces. This action of discharge of copper ions forming metallic copper on surfaces other than metallic iron is a characteristic phenomenon and a general condition, and takes place in case of brass or copper particles or coarse cement copper in the precipitator with the result that such particles form growths of copper which accumulate in the precipitator. In order to take care of such accumulations of coarse metallic copper, I propose the methods of eliminating such coarse copper by grinding during precipitation or by allowing it to segregate in the precipitator and simultaneously with the precipitating operation to remove said metallic copper by mechanical means of elimination.

From the above description it is evident that either relatively fine metallic iron, such as sponge iron, or relatively coarse material, such as cut or minced tin, ordinary scrap or balls, or iron poured from molten state, may be used. In case of very finely divided iron any standard type of agitator may be employed, but for coarse material a rotary cylindrical mill or drum, such as disclosed by Dosenbach 1,477,476 and Terry 1,589,615, is recommended. Such a mill or drum is also advantageous for sponge iron precipitation. It is my purpose in such a type precipitator to avoid as far as possible lifting of the iron charge out of the pulp during rotation of the mill, but to keep the iron charge within the pulp, thus affording greater contact and avoiding aeration.

In providing requisite agitation I prefer to agitate the pulp and solution lying over and in the iron charge and to mix this with the iron, rather than to agitate by lifting the iron substantially out of the mixture. In order to prevent short-circuiting of pulp through the drum, I provide cross sectional baffles where necessary. Longitudinal baffles may also be used to mix the iron with the pulp. The maximum charge of material may be held within the drum by use of suitable gland connections at feed or both feed and discharge ends.

By adopting means to prevent accumulation of coarse copper during precipitation, continuous functioning of a precipitating mill is made possible. If grinding action is not employed for this purpose I propose the method of preventing such accumulations by continuously discharging at least part of the pulp from the bottom of the charge where the coarser particles tend to segregate, in contradistinction to the ordinary type of discharge which overflows at the axis of the drum. My method of pulp discharge may be accomplished in a variety of ways and is not limited to any specific mechanical means as long as the requirements are fulfilled of maintaining a high pulp level preferably above the axis of the mill, provision of means for removing coarse material with the pulp, and simultaneously removing at least part of the effluent pulp from the bottom of the charge.

Such a method may be carried out by a device such as shown diagrammatically in Figure 3 of the accompanying drawings. In this figure, I represents a precipitating drum having a pulp level as indicated by the line 2. There are mounted in the drum a plurality of pipes, preferably four, such as indicated by numerals 3, 4, 5 and 6. These pipes are connected together at the axis of the drum by a connection which has an opening in its center, such as 7, that matches the drum discharge opening.

I have shown each of the pipes 3, 4, 5 and 6 as having different peripheral openings, for the purpose of showing the possible varied constructions in this respect. Under ordinary circumstances, however, the ends of the pipes would be uniform for each of the four pipes. It will be noted, for instance, that pipe No. 3 is provided at the peripheral end with a 45° bend and with no constriction. Pipe 4 has no bend but may be provided with an opening that is angularly disposed. Pipe 5 has a long projection at the peripheral end and is provided with a constricted opening. Pipe 6 is provided with a 90° bend and with a constricted opening. The exact construction of the pipe in any given drum will depend upon the conditions of operation.

The assembly of the pipes would preferably be installed in a cylindrical, rather than a conical, end. Inasmuch as the open ends of the pipes extend to the periphery of the drum, and inasmuch as the pulp level is above the axis of the drum, pulp is discharged from the bottom as well as at other levels in the pulp, the pulp flowing from the arms to the pulp discharge.

By maintaining sufficient peripheral speed the coarse iron will tend to be thrown out of, instead of into, these discharge pipes, inasmuch as the combined effects of centrifugal force and gravity will operate to keep the coarse iron from entering these discharge pipes while the pulp passes through. On the other hand, the small particles of copper which sink to the bottom of the charge will be eliminated with the pulp and discharged before these grow to a large size or accumulate in quantity.

The size and number of these discharge pipes, relative size of peripheral openings to pipe diameter, angle and direction of bends, direction of peripheral openings, and length of the projections on the discharge pipes must be determined for specific conditions.

The level of pulp in the drum may be regulated by extending a pipe from the drum discharge to a variable weir overflow, the pipe, of course, going through a stuffing box. Inasmuch as some metallic iron may be carried out in the pulp along with the coarse pieces of metallic copper, I propose to employ suitable screening, magnetic separation, or other methods for return of the iron to the drum and separation of any coarse metallic copper.

The advantages of the type of drum just discussed are that both the pulp and iron levels may be carried at any desired distance above the center of the drum, thus giving increased precipitating capacity. Furthermore, entrained air and gases will be eliminated, even with the pulp level above the center. The principal advantage is that the material in the drum is eliminated from the bottom as well as the top of the charge, which results in an elimination of coarse copper, and prevents copper growths from accumulating on particles in the charge.

As a modification of the above method I may, in some cases, prefer to allow coarse copper nodules to grow in the precipitating apparatus and to produce a certain fraction of copper in this form. In such case, I propose to eliminate such copper from the rotary precipitator by means of radial lifter scoops located at the discharge end, which pick up the copper nodules from the bottom and by mechanical lifting action caused by rotation of said mill, elevate the coarse copper sufficiently above the rest of the charge so that it falls by gravity and is deflected into the discharge opening of the mill. In such case mutual separation of coarse copper pulp and metallic iron is then accomplished as aforesaid and the metallic iron returned to the precipitator.

Inasmuch as the rate of formation of such coarse copper increases as the copper surfaces exposed I propose further to control the formation of such nodules by controlling the amount of coarse copper present in the precipitator.

Furthermore, I may take advantage of the tendency to plate copper surfaces in contact with metallic iron and copper sulphate, and make use of copper as lining and wearing surfaces for the interior of the precipitating mill. By lining said mill with thin copper sheets, I am able to utilize electrochemical action thus set up to plate copper onto said sheets and to utilize this copper as a wearing surface or to remove such plates as a part of the copper production.

The following observation illustrates the electrochemical action taking place during copper precipitation by iron, which causes growths of copper nodules when metallic copper is in contact with metallic iron in copper-iron sulphate solution, regardless of the type of apparatus or kind of iron employed.

In a mechanically agitated tank used for copper precipitation by sponge iron, no coarse copper was formed during a period of several weeks operation when agitation was sufficient to eliminate the products as fast as formed. However, after operating a few days with decreased agitation so that the sponge iron and cement copper settled and made contact together on the bottom of the tank a large quantity of copper nodules was formed of the size of marbles.

Similarly, plating of copper on articles of copper or brass in a precipitating mill employing copper solution and metallic iron has been noted. This shows the importance of my method of preventing accumulations of coarse copper during precipitation.

In the use of a mill or drum type precipitator it is important to secure iron of suitable physical characteristics and to expose a large surface. Also, I have found the presence of tin detrimental to cement copper flotation. I, therefore, propose as a logical precipitant the use of metallic iron prepared by pouring molten iron in such manner as to subdivide it into suitable small particles, as by granulating molten iron with a jet, by pouring it onto a cold surface, or by pouring molten iron into a liquid, such as water, under conditions to produce separate and flattened iron particles. In such preparation of precipitant, I use means such as a neutral or reducing atmosphere to avoid formation of the characteristic oxide scale on the iron particles which normally is formed by cooling of molten iron. As this oxide scale prevents chemical action of the copper solution on iron, preparation of iron free from such scale and suitable for use as a precipitant is hereby disclosed as a part of this process.

This method of preparing molten iron is more fully described and claimed in its various aspects in my Patent No. 2,070,134.

Similar to the method given in my Patent No. 1,971,416, this process uses a water soluble alkaline precipitant, such as milk of lime, to partially precipitate the iron in solution following precipitation of the copper. This step performs the double function of precipitating, as copper hydroxide, from 70 to 98 percent of any copper in solution after contacting with iron, and also protecting the cement copper from oxidation and resolution in the subsequent steps. This precipitation of copper by lime protects plant equipment from corrosion and the prevention of re-solution may be extended by use of additional small amounts of lime at any stage of the cement copper flotation, particularly in the cleaning or in secondary treatment operations. Actual test results show that not only is re-solution of cement copper during flotation largely inhibited by my method and that copper in solution after contact with iron is substantially precipitated by lime during the partial precipitation of iron, but also that this copper hydroxide is partially recovered in the rougher flotation.

The simultaneous combination of thickened leached pulp, partial precipitation of iron by lime, and addition of a flotation reagent mixture produces a novel result in that said pulp is thus given an improved conditioning for flotation, such that the froth characteristics are stabilized and improved, the froth being persistent and cement copper recovery from the flotation cell being extremely rapid as compared with other sets of conditions. This improved condition of froth characteristics shows that definite co-action takes place in the steps of pulp thickening, addition of lime or alkali after copper precipitation by iron with partial precipitation thereby of iron and substantially complete precipitation of copper, addition of flotation reagent and subjecting the aforesaid mixture to flotation treatment with ferrous iron present both in the dissolved and precipitated condition, to produce an improved result.

Not only does the lime added as above afford inhibition of re-solution during flotation and also protection of mechanical equipment by virtue of completing the copper precipitation, but the improved condition of froth characteristics which it produces greatly enhances the recovery of copper in the flotation subsequent to adding of lime. I have further found that certain flotation reagents are highly susceptible to changes in hydrogen ion concentration of the pulp, and it is also generally known that hydrogen ion concentration is a vital factor in certain other types of flotation. I have further found, however, that this hydrogen ion concentration may be controlled, flotation conditions stabilized and an improved flotation recovery effected by the aforesaid use of an alkaline reagent, as milk of lime, to partially precipitate the iron prior to flotation. This beneficial effect of lime on pulp conditioning is a novel result and is in addition to the improvements which I have previously described relative to use of alkaline precipitants.

As an example of the improvement in conditioning for cement copper flotation effected by thickening prior to adding a relatively insoluble organic sulphur compound (such as "Minerec A") used as the collecting medium, reference is made to actual demonstration in which at 32 percent solids and without dewatering but only adding lime prior to cement copper flotation a tailing of 0.41 percent copper was obtained. By simply thickening the pulp to 40–42 percent solids prior to leaching, but not adding lime, the tailing loss was 0.48 percent copper. However, by adding lime after copper precipitation and ahead of flotation to precipitate approximately 15 percent of the iron, the pulp density remaining at 40–42 percent solids, the final flotation tailing was lowered to 0.23 percent copper, representing a marked saving by the combined use of a thickened pulp, partial precipitation of iron by lime and conducting flotation in presence of ferrous hydroxide.

Furthermore, it was found that under the above conditions of a pulp thickened to at least 40 percent solids and partial precipitation of ferrous iron by lime prior to flotation an entirely different type of flotation froth was produced than formerly, using in both cases an organic sulphur collector of the insoluble type.

In the case of thickening and the use of lime the froth was easily formed, tough, tenacious and loaded with mineral much better than formerly, thus showing that this combination of steps produced a novel and improved result. The above operation illustrates that there is an optimum set of conditions as to pulp density, iron in solution, iron precipitated and hydrogen ion concentration, which produces the desired froth characteristics to give this improved flotation of cement copper, and that such optimum conditions are obtained by use of my method herein disclosed.

Lime emulsion is added to the drum effluent as shown. If special conditioning is required the flotation reagent is added also at this point. However, the type of flotation reagent and points of addition are not fixed by the conditions of this process. G is a mixer, conditioner or pump which prepares the pulp for cement copper flotation, H being the rougher and I the cleaner. The rougher tails may be discarded or sent to thickener T—3 for reclaiming of iron solution for acid regeneration.

The cement copper cleaner reject, together with any other middling products, are sent preferably through a thickener T—4 for discarding of water and are then given the acid-iron-lime treatment, as previously mentioned, before being again subjected to flotation. The drawings illustrate return of these middlings to the main circuit, but if desired, they may be removed entirely and treated in a separate system.

It has been shown in my above mentioned copending application Ser. No. 733,249 that the nature of cement copper alters with aeration, copper sulphate and copper oxide being formed. Although this alteration is largely inhibited by the milk of lime treatment, yet repeated passages through flotation cells and pumps tend to render a certain amount of the copper unfloatable. For this reason, it is the aim of my method to include a special treatment for intermediate products, cleaner rejects or secondary concentrates which in standard practice would be recirculated back into the cement copper flotation system and ultimately lower the grade of the final concentrate and raise the tailing.

As given in my said copending application, this process includes the step of removing such circulating loads from the cement copper flotation system, rendering the copper sulphate and oxide floatable by changing the chemical form of the unfloatable copper and then treating the product again by flotation. This may be accomplished by first giving such middlings an acid treatment to dissolve oxidized forms of copper, adding lime to the pulp as pointed out above, precipitating with metallic iron, and then subjecting the pulp to flotation.

This treatment of the middlings can be not only readily carried out by reintroducing the middlings into the main circuit but an advantage in such a step resides in the fact that lime can be conserved thereby. In Figure 1 it will be noted that the cleaner rejects are preferably thickened, in thickener T—4, and then such thickened pulp introduced to the main circuit intermediate the leaching and the precipitation steps. The oxidized copper in the middling products will be dissolved by any excess acid, thereby tending to neutralize the pulp from the leaching stage, and at the same time effecting an economy in the amount of lime necessary to neutralize the pulp. The middlings, after reintroduction into the main circuit, are of course subjected to the same treatment as the original pulp therein.

It is understood that the above described flow sheet is merely indicative of the principles constituting my process and that wide variations are possible without deviating from my invention. In certain cases some of the steps shown may even be eliminated, as is indicated by the dotted lines in the drawings, and still conform to the features of this process. Also, in re-treating cement copper middlings auxiliary flotation cells may be employed to make a final tailing and the concentrate may be re-treated by acid and iron. When middlings are added to the precipitator feed, the lime at this point is modified or eliminated.

In the foregoing description attention has been directed to the improved result obtained in cement copper recovery as a result of pulp thickening as well as the beneficial effect of ferrous hydroxide in beneficiating the conditioning effect for flotation. These benefits apply particularly when using a relatively insoluble type of organic sulphur compound requiring dispersion or emulsification. In the references to "thickening" or "increasing pulp density" in this connection it is understood that these terms are used in their more popular sense and do not restrict the operation to mere extraction of water unless such limitation is clearly imposed by conditions set forth. In many cases the concept of thickening, as here applied, is also definable in terms of viscosity, and such viscosity may be increased by addition of relatively small amounts of slimy substances, such as iron hydroxide as described in this specification, which alter the pulp consistency.

It will of course be appreciated that various modifications may be made in my invention without exceeding the scope of the appended claims, by which alone I am to be bound.

I claim:

1. A leaching-precipitation-flotation process for copper ores comprising grinding and classifying the ore, thickening the pulp subsequent to classification, leaching the thickened pulp, neutralizing free acid in the leached pulp, precipitating the copper in the pulp by metallic iron, then conditioning the pulp with a water-soluble alkaline precipitant, subjecting the conditioned pulp to flotation, and reintroducing the intermediary products of such flotation into the circuit prior to precipitation.

2. A process for treating copper ores containing oxidized values which consists in grinding the ore to a pulp, removing water from the pulp, leaching with sulphuric acid, treating the pulp with metallic iron and thereby precipitating copper in finely divided form, adding a water-soluble alkaline precipitant and thereby precipitating a portion of the dissolved iron and leaving a portion of the iron in solution, subjecting the mixture to flotation and recovering copper thereby from said pulp.

3. A process as given in claim 2, but including recovery of iron bearing solution from copper precipitation, contacting said solution with sulphur dioxide and air, and addition of acid so produced to the leaching circuit.

4. A process as given in claim 2, but including precipitation of copper in a rotary type mill and discharge of pulp from said mill by means communicating with or adjacent to the periphery so that copper segregated at or near said periphery is discharged and accumulation of said copper inhibited.

5. A process as given in claim 2, but also including the retreatment of cement copper flotation middlings and similar products by removal from the flotation circuit, and reforming cement copper surfaces instead of oxidized forms and then subjecting such products to a further flotation treatment for recovery of the contained copper.

6. A process as given in claim 2, but also including the use of metallic iron prepared by subdividing molten iron into small particles under such conditions that the characteristic iron oxide coatings are not formed during cooling of the molten iron, so that surfaces substantially of metallic iron are produced and then exposed to the copper-bearing solution when said subdivided iron particles are added to the copper-precipitating apparatus, said particles being of such a size as to permit mechanical feeding into a precipitating drum with the ore pulp and to be substantially retained in the drum during the discharge of the pulp and precipitated copper.

7. A leaching process for copper ores comprising passing sulphur dioxide into a pulp of such ore whereby the gas is absorbed by the pulp, aerating the pulp and the absorbed gas to partially oxidize the formed sulphites to sulphates, and then adding sulphuric acid.

8. A leaching-precipitation process for copper ores comprising leaching a pulp of the ore, thickening the leached pulp, precipitating the copper in the clear solution from the thickening step, and precipitating the copper in the thickened pulp.

9. A leaching process for copper ores comprising leaching with regenerated acid, adding lime to the leached pulp, then thickening the leached pulp, precipitating the copper in the clear solution from the thickening step, and passing some of the effluent from such precipitation step to the acid regenerator circuit.

10. A leaching-precipitation process for copper ores comprising leaching a pulp of the ore, thickening the leached pulp, precipitating the copper in the clear solution from the thickening step, passing a portion of the solution after such precipitation to the thickener feed, and precipitating the copper in the thickened pulp.

11. In a leaching-precipitation-flotation process in which the ore is first leached by regenerated acid, then precipitated by metallic iron and then floated, the steps of thickening the flotation tails, and introducing the thickener overflow to the acid-regeneration circuit.

12. A leaching-precipitation-flotation process for copper ores comprising grinding and classifying the ore, thickening the pulp subsequent to classification, leaching the thickened pulp, neutralizing free acid in the leached pulp, precipitating by metallic iron the copper in the pulp, then conditioning the pulp with a water-soluble alkaline precipitant and subjecting the conditioned pulp to flotation.

13. A process for treating copper ores containing oxidized values which consists in grinding the ore to a pulp, removing water from the pulp, removing the sulphide constituents of the pulp, leaching the non-sulphide portion with sulphuric acid, treating the leached pulp with metallic iron in a rotary type mill, and discharging the coarse copper from said mill by means communicating with the periphery so that copper segregated at or near said periphery is discharged, adding a water-soluble alkaline precipitant to thereby precipitate a portion of the dissolved iron and leaving a portion of the iron in solution, and subjecting the mixture to flotation to recover copper from said pulp.

14. A process for treating copper ores containing oxidized values which consists in grinding the ore to a pulp, removing water from the pulp, leaching with sulphuric acid, treating the leached pulp with metallic iron in a rotary type mill precipitator in which the pulp level is substantially above the axis, discharging the pulp from said mill by means communicating with the periphery thereof, adding an alkaline precipitant to thereby precipitate a portion of the dissolved iron and leaving a portion of the iron in solution, and subjecting the mixture to flotation to recover copper from said pulp.

15. A process for treating copper ores containing sulphide and oxidized values which consists in grinding the ore to a pulp, recovering the sulphide values by a flotation step, thickening the tailings from the sulphide flotation step, leaching the thickened pulp, precipitating the copper in the leached pulp by metallic iron to form finely divided cement copper, adding a water-soluble alkaline conditioning agent to precipitate a portion of the dissolved iron, and subjecting the conditioned pulp to flotation to recover the copper therefrom.

16. A process for treating copper ores containing sulphide and oxidized values which consists in grinding the ore to a pulp, thickening the pulp, recovering the sulphide values by a flotation step, leaching the flotation tailings, precipitating the copper in the leached pulp by metallic iron, adding a water-soluble alkaline conditioning agent to precipitate a portion of the dissolved iron, and subjecting the conditioned pulp to flotation to recover the copper therefrom.

17. In a leaching and precipitation treatment for copper ores, the step of adding to the pulp after the leaching stage, but prior to the precipitation stage, a water-soluble base in a greater amount than the theoretical quantity necessary to neutralize the free acid.

18. In a leaching-precipitation-flotation process for the treatment of copper ores, the step of adding between the leaching and precipitation stages, a water-soluble base and middling products from the flotation step.

19. A method of recovering copper comprising treating a copper sulphate solution with metallic iron in a rotary type mill to precipitate finely divided cement copper and nodular copper removing from the drum during operation a mixture of finely divided cement copper, nodular copper, metallic iron, and pulp, separating the nodular copper and metallic iron from the finely divided cement copper pulp, reclaiming the metallic iron from the nodular copper, and returning the said reclaimed iron to the copper precipitating circuit.

20. A leaching process for copper ores comprising leaching with regenerated acid and with supplemental commercial strength sulphuric acid, thickening the leached pulp, precipitating the copper in the clear solution from the thickening step, and passing some of the effluent from such precipitation step to the acid regenerator circuit.

21. In a leaching-precipitation process for ores containing oxidized copper values in which free acid exists at completion of the leach, the steps of neutralizing at least a portion of the free acid in said leaching effluent by adding to said effluent a water soluble base, and then precipitating the copper from solution by the use of iron.

22. In a leaching-precipitation process for ores containing oxidized copper values in which free acid exists at completion of the leach, the steps of neutralizing at least a portion of the free acid in said leaching effluent by adding to said effluent a water soluble base, and then precipitating the copper from solution by the use of finely divided iron.

23. In a leaching-precipitation-flotation process for the treatment of copper ores in which the flotation is carried out at a relatively thick pulp density, the steps of removing a product from the flotation stage which is intermediate the concentrate and the tailings, thickening the said product, and returning the thickened product to the circuit ahead of the precipitation stage.

24. In a precipitation process for the recovery of metallic copper from solution, the steps of mutually contacting the copper solution, metallic iron, and metallic copper in a rotary type precipitator while agitating such solution-iron-copper mixture at a rate to form mechanically separable copper aggregates, and discharging the aggregates so formed from said precipitator by means communicating with the periphery of the precipitator.

25. In a precipitation process for the recovery of metallic copper from solution, the steps of agitating dissolved copper with metallic iron in a rotary type precipitator, and discharging the precipitated copper from said precipitator by means communicating with the periphery thereof.

26. In a precipitation process for the recovery of metallic copper from solution, the steps of agitating a pulp containing dissolved copper with metallic iron in a rotary type precipitator, and discharging the precipitated copper from said precipitator by means communicating with the periphery thereof.

27. A leaching process for copper ores comprising introducing sulphur dioxide, ferrous sulphate and air into a pulp of such ore, and complementing such addition by introducing commercial strength sulphuric acid.

28. A leaching-precipitation process for copper ores comprising thickening the leached pulp, precipitating the copper by iron in the clear solution from the thickening step, and reintroducing the iron bearing solution, air and sulphur dioxide into the pulp ahead of leaching.

29. A leaching-precipitation process for copper ores comprising leaching with regenerated acid and with supplemental sulphuric acid, the step of precipitating the copper from solution by the use of metallic iron, mixing sulphur dioxide with some of the iron-bearing solution from such precipitation stage to thereby form ferric sulphate and sulphuric acid, and then reintroducing said regenerated sulphuric acid and ferric sulphate at the leaching stage.

30. In a process for treating copper ores in which the entire ore pulp is successively ground, classified, leached, precipitated and then floated, the steps of conditioning the cement copper for flotation by the addition of a water soluble alkaline precipitant, and subjecting the pulp to the said conditioning stage at a greater density than that employed for the grinding and classifying steps.

31. In a leaching-precipitation-flotation process for copper ores, the steps of neutralizing free acid in the leached pulp prior to copper precipitation by adding a water soluble base to such pulp, and then precipitating iron hydroxide in the pulp after copper precipitation and before flotation by adding a water soluble base to the pulp.

32. In a leaching-precipitation-flotation process for copper ores, the steps of grinding and classifying the ore, leaching the pulp, precipitating copper in the leached pulp by treating with a bed of metallic iron which is substantially retained in a rotary drum, thereby producing finely divided cement copper in the pulp and leaving only a minor portion of the copper in solution, adding milk of lime to precipitate both dissolved copper and iron as hydroxide, adding a flotation collecting reagent which does not combine chemically with either copper hydroxide or copper in solution, and then subjecting said pulp mixture to a flotation treatment for recovery of cement copper.

33. A method for leaching ores with sulphur dioxide which consists in establishing a body of pulp in a stationary container, elevating a portion of said pulp above the normal pulp level to form a second body of pulp, allowing the pulp in said second body to accumulate a sufficient head to fall in forceful sheet-like formation back into the first body of pulp, and simultaneously passing a current of sulphur dioxide containing gas through the space defined by the first body of pulp and the second body of pulp, thereby absorbing sulphur dioxide into the pulp by the aforesaid cascading action, and repeating said operation until the desired degree of combination of sulphur dioxide with the pulp constituents is obtained.

34. In a copper precipitation process involving supplying pulp to a mechanical precipitator, the step of depositing metallic copper in slab formation by electrochemical action which comprises simultaneously agitating and mutually contacting metallic iron, copper sulphate solution, and a continuous metallic copper surface, the agitation being such that the rate of copper deposition on said metallic copper surface is greater than the rate of abrasion of said surface caused by said agitation.

HARMON E. KEYES.

Patent No. 2,130,278                         Granted September 13, 1938

HARMON E. KEYES

The above entitled patent was extended October 2, 1951, under the provisions of the Act of June 30, 1950, for 6 years and 82 days from the expiration of the original term thereof.

*Commissioner of Patents.*